United States Patent [19]

Tamaki et al.

[11] Patent Number: 4,666,299

[45] Date of Patent: May 19, 1987

[54] INCLINATION MEASURING APPARATUS HAVING A PRISM WITH ASSOCIATED LIQUID CONTAINER

[75] Inventors: Hiroshi Tamaki; Fumitomo Kondo; Hiroo Sugai, all of Tokyo, Japan

[73] Assignee: Tokyo Kogaku Kikai Kabushiki Kaisha, Tokyo, Japan

[21] Appl. No.: 729,665

[22] Filed: May 2, 1985

[30] Foreign Application Priority Data

May 4, 1984 [JP] Japan .................................. 59-88491

[51] Int. Cl.⁴ ........................ G01C 9/20; G01B 11/26; G02B 5/06
[52] U.S. Cl. .................................. 356/138; 356/249; 33/366; 33/377; 350/286
[58] Field of Search ........................ 350/112, 286, 418; 356/249, 138, 150; 33/366, 377

[56] References Cited

U.S. PATENT DOCUMENTS

| T936004 | 7/1975 | Willis | 350/112 |
|---|---|---|---|
| 3,514,192 | 5/1970 | De La Cierva | 350/418 |
| 3,655,274 | 4/1972 | Craig | 350/286 |
| 3,659,927 | 5/1972 | Moultrie | 350/286 |
| 3,784,288 | 1/1974 | Toy | 350/286 |
| 3,838,909 | 10/1974 | Fitzgibbons | 350/286 |
| 3,905,707 | 9/1975 | Feist et al. | 356/249 |
| 3,910,704 | 10/1975 | Richarme | 356/249 |

FOREIGN PATENT DOCUMENTS 99712  6/1983  Japan .................................. 356/249

*Primary Examiner*—Jon W. Henry
*Attorney, Agent, or Firm*—Finnegan, Henderson, Farabow, Garrett & Dunner

[57] ABSTRACT

An inclination measuring apparatus having a prism and a container having a liquid sealed therein for providing a liquid surface perpendicular to the direction of gravity. A member constructed from thermal conductive material is position under the liquid surface to maintain the liquid surface level in the presence of ambient temperature changes.

4 Claims, 7 Drawing Figures

INCLINATION MEASURING APPARATUS HAVING A PRISM WITH ASSOCIATED LIQUID CONTAINER

BACKGROUND OF THE INVENTION

1. Field of the Invention

This invention relates to a prism having a liquid container to be used for measurement, and more particularly to be used as an apparatus in which an angle of inclination is measured based on the direction of gravity.

2. Description of the Prior Art

Heretofore, there is known a prism and associated liquid container to be used for an inclination measuring apparatus in which a liquid such as silicon oil is sealed in a liquid container in order to always provide a free liquid surface perpendicular to the direction of gravity, irrespective of the inclination of the apparatus. There are two types of inclination measuring apparatus; one is a reflection type in which light is caused to enter in the liquid prism and then the deflection angle of light totally reflected on and radiated from the free surface of the liquid is measured, and the other is a transmission type of inclination measuring apparatus in which light enters the liquid prism and then the transmission deflection angle of light transmitted through the free surface of the liquid is measured.

However, when these two types of apparatus are used for measurement, a problem results when the outside temperature is suddenly changed, because this causes the reflection light or transmission light to be disordered for a long time, and during this time the measurement either cannot be made at all or cannot be made accurately. However, the cause for this problem is not clear, but it was was considered to be attributable to a defect in the liquid prism.

After a careful study, the present invention has found that with conventional liquid prisms, when a sudden change in temperature results, a temperature difference is produced between a portion of the liquid contacting the liquid container and a portion of the liquid in the center thereof. This causes a convection of the liquid, and as a result, the smoothness of the free liquid surface is deteriorated for a long time. That is, when the outside temperature is drops abruptly, the temperature of the liquid around the area contacting the container becomes lower than that of the liquid around the central area of the container. Thus, the gravity of the former becomes larger than that of the latter. Accordingly convection is produced wherein the liquid extends upwardly at its central portion and downwardly at its wall surface portion. The result is that the free liquid surface is not stable which causes the disorder of the light reflected on or transmitted through the surface. Similarly, when the temperature is suddenly raised, the reverse happens thus producing a similar phenomenon to that.

SUMMARY OF THE INVENTION

An object of this invention is to overcome this problem.

It is therefore an object of the invention to provide a liquid prism which is not susceptible to the deficiencies of the prior art. Specifically, the present invention provides a liquid prism, with which a stable measurement can be performed even under an unfavorable condition where the outside temperature is suddenly changed.

In order to achieve the above object, there is essentially provided a liquid prism comprising a liquid for obtaining a free liquid surface perpendicular to the direction of gravity; a liquid container adapted to seal the liquid therein and formed of a light transmitting material at at least a part of its bottom surface portion; and a good thermal conductive material such as a metallic material provided under the free liquid surface of the liquid. The present invention resides in the employment of the good thermal conductive material disposed deep enough under the free surface of the liquid so that the material will not interfere with the free liquid surface, even when the container is inclined at angles within the range of measurement.

Other objects, novel features and advantages of the present invention will be made apparent from the following detailed description of a preferred embodiment of the invention.

DETAILED DESCRIPTION OF THE EMBODIMENTS

Preferred embodiments of the present invention will be described hereunder with reference to the accompanying drawings wherein like numerals designate corresponding elements in the several figures.

Figure 5:
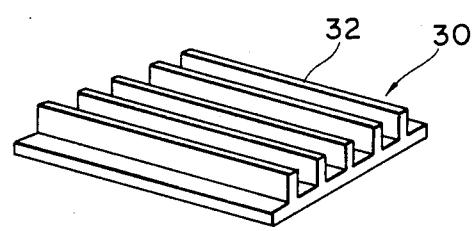
FIG. 5 is a perspective view of a second modified embodiment of a good thermal conductive material.
Figure 6:
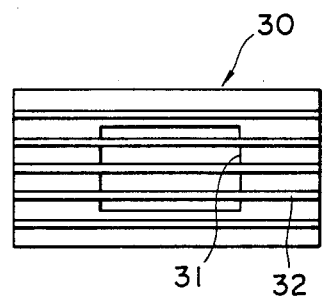
FIG. 6 is a plan view of the second modified embodiment.
Figure 7:
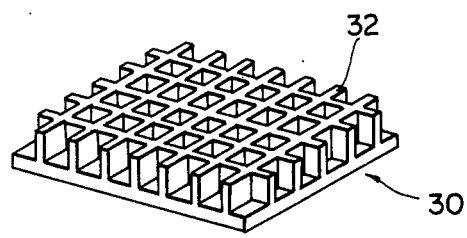
FIG. 7 is a perspective view showing a third modified embodiment of a good thermal conductive material.

FIGS. 1 through 6 illustrate embodiments of liquid prism according to the present invention. In the figures, 10 denotes, for example, a silicon oil with a refractive index of 1.4, which is sealed in a liquid container 20. The container 20 comprises a bottom surface portion 21 formed at at least a part thereof of a light transmitting material and a cap portion 22. In this embodiment, the entirety of the bottom surface portion 21 is formed as a glass prism having a refractive index of 1.52. If selection is required from other materials than glass, the light transmitting material may be selected from a resin material. The configuration thereof is not necessarily of a prism shape as shown in the figures. The bottom surface portion 21 includes a transmitting surface 21a and a reflecting surface 21b perpendicularly intersecting with respect to each other. Within the container 20 with the above structure, the liquid 10 and the good thermal conductive material 30 are sealed. The good thermal conductive material 30 is placed deep enough under a free liquid surface 11 of the liquid 10 so that the material 30 does not affect the free surface 11 even if the former is inclined at angles within the range of measurement. The thermal conductive material 30 has better thermal conductivity than the liquid 10 and is made of a good thermal conductive metallic material such as, for example, copper and aluminum. The good thermal conductive material 30 is formed in a generally rectangular prism configuration, having an opening 31 in at least a part thereof, for example, a central portion, for permitting the light from the bottom surface portion 21 of the liquid container 20 to transmit therethrough. Modified embodiments of the good thermal conductive material 30 are illustrated in FIGS. 3 through 7, wherein an irregular portion is formed at the side thereof facing toward the free liquid surface 11. More specifically, in FIG. 3 and FIG. 4, a first modified embodiment is shown, wherein a plurality of projections 32 are arranged in parallel relative to each other along one side, but excepting the area where the opening 31 is formed. According to a second modification as shown in FIG. 5 and FIG. 6, continuous projections are formed even on the opening 31. With regard to a third modification as shown in FIG. 7, additional projections are formed in the intersecting direction with respect to the second modification, thus forming a check pattern. The good thermal conductive material 30 may be of a combination of small projections, or otherwise of a rigid structure together with the cap portion 22. Furthermore, each of the projections 32 is not necessarily of a continuous structure. Instead, it may be formed in a discontinuous structure. Furthermore, the irregular portion is not necessarily of such projections as extending horizontally. Instead, they may take desired shapes projecting from desired places.

Figure 1:
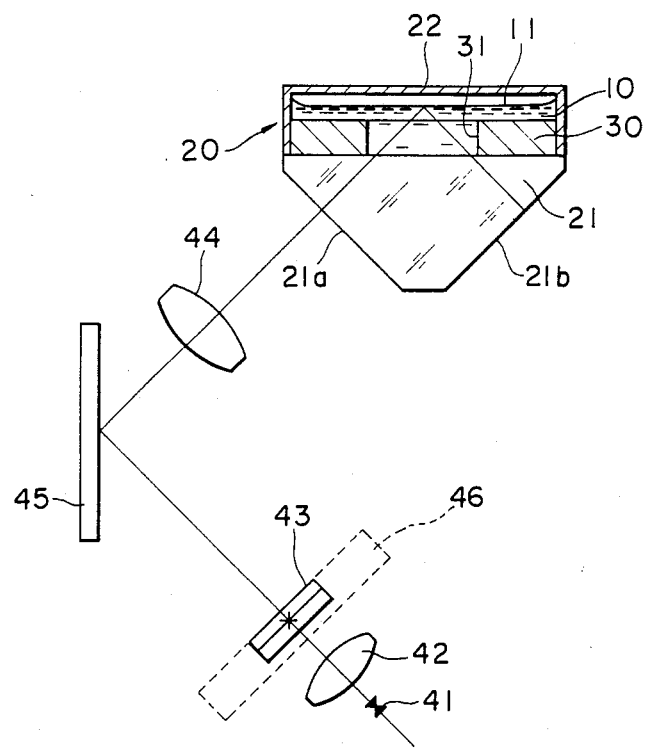
FIG. 1 is a sectional view showing an optical system of an inclination measuring apparatus employing a liquid prism according to one embodiment of the present invention.
Figure 2:
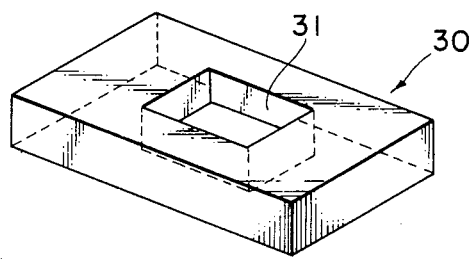
FIG. 2 is a perspective view showing one example of a good thermal conductive material.
Figure 3:
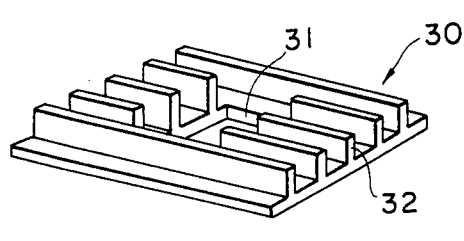
FIG. 3 is a perspective view showing a first modified embodiment of the good thermal conductive material.
Figure 4:
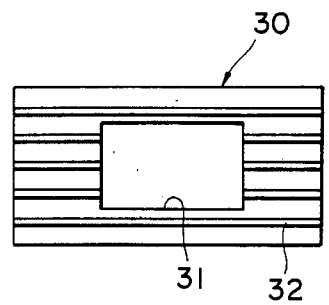
FIG. 4 is a plan view of the first modified embodiment.

One example of an optical system wherein a liquid prism having such a structure as described is applied to, for example, a reflection type of inclination measuring apparatus, is shown in FIG. 1. The light from an illumination element 41 is condensed through a condenser lens 42 in order to illuminate a test chart 43. The test chart 43 is placed in a focal position of a collimate lens 44 displaced in the normal direction with respect to the paper surface. The bundle of rays from the test chart 43 is formed into a bundle of parallel rays by the collimate lens 44 from a reflecting mirror 45, and enter the liquid prism. That is, the bundle of rays enters a transmitting surface 21a of the bottom surface portion 21 as a prism of this liquid prism. The bundle of rays entering through the transmitting surface 21a progresses in the liquid of silicon oil inside of the opening 31 formed in the good thermal conductive material 30. The rays are totally reflected on the free liquid surface 11, then reflected on a reflecting surface 21b of the bottom surface portion 21, and totally reflected again on the free liquid surface 11. Finally the rays are radiated from the transmitting surface 21a. The bundle of rays from the transmitting surface 21a is condensed by the collimate lens 44 to form a test chart image on a CCD detector (a storage type sensor).

With the above instruction of the apparatus, when the inclination angle of the apparatus is deemed as $\theta$, the travelling amount of the test chart image on the CCD detector 46 as l, the focal distance of the collimate lens 44 as f, and the coefficient of the inclination as k, the following relation is obtained:

$$\theta = k \tan^{-1}(l/f)$$

When the angle for entering into the free liquid surface is deemed as 50°, the refractive index of the prism as 1.52, and the refractive index of the silicon oil as 1.4, a relation of k=1/4.88 is obtained. Thus, the inclination $\theta$ can be obtained from the detected shifting amount l.

Various types of the test chart and detector can be selected. One example is that the test chart is constructed with a slit and the detector is constructed with a one dimensional line sensor.

When an inclination measuring apparatus with the above mentioned construction is subjected to an abrupt change of temperature, the temperature change is naturally applied to the liquid prism, too. The heat is transmitted to the liquid 10 through the liquid container 20, and more specifically through the cap portion 22 as well as the bottom surface portion 21. During the process, since the good thermal conductive material 30 is superior in thermal conductivity to the liquid 10, it transmits the heat to its portion contacting the liquid 10 very quickly as soon as it receives the heat from the liquid container 20. Accordingly, since the liquid 10 receives the heat not only from the liquid container 20 as in the case with the prior art, but also from the good thermal conductive material 30 extending to the central portion of the liquid 10, a heat exchange is performed in a wide range by means of the good thermal conductive material 30, thereby quickly averaging the temperature. Because of the foregoing, the convectional phenomenon does not happen at all, or only to a small degree and in a short time. Accordingly, the free liquid surface 11 is not disturbed at all, or if disturbed, the deterioration of the smoothness of the free liquid surface 11 can be recovered to its initial state in a short time. Thus, a stable measurement can be obtained.

With a plurality of projections 32 providing an irregular portion as seen in the first modification, of the conductive material 30 the contacting area thereof with the liquid 10 becomes comparatively large which makes the heat change area large. Thus, the temperature can be more effectively averaged. Furthermore, the projections 32 as an irregular portion interfere the convectional phenomenon about the central portion of the liquid along the inner wall of the liquid container 20. Thus, the free liquid surface 11 is not much as greatly disturbed. Moreover, even if a shock is applied from outside, the liquid 10 is not moved much, since the projections 32 serve to partition the liquid 10. Thus, the shock applied thereto is absorbed and weakened.

Contrary to the preceding two examples, according to the second modification, the projections 32 are also formed on the opening 31. This means that in a place where more liquid is present, the heat exchange area is increased and platelike means are provided for preventing the movement of liquid 10. Thus, the free liquid surface is even more stabilized. In this case, since the opening 31 permitting the light to be transmitted therethrough is partly blocked, the bundle of rays is partly prevented from passing therethrough and the quantity of light is decreased. However, since the bundle of rays is projected in parallel, no adverse affect result.

Furthermore, according to the third modified embodiment, since the projections 32 are provided not only one direction but also in another direction intersecting therewith thus forming a check problem, the free liquid surface is even more stabilized than with the second modification.

Although the invention is applied to a reflecting type of liquid prism in the above embodiments, it may of course be applied to a transmitting type of liquid prism with similar effects as mentioned.

As described in the foregoing, according to the present invention, due to the rapid transmission of heat by means of a good thermal conductive material disposed deep under the free liquid surface and the increase of the heat exchange area, the temperature of each portion of the liquid can be rapidly averaged. Accordingly, even when the outside temperature is suddenly changed, no convectional phenomenon is generated in the liquid. Thus, the free liquid surface is is not disturbed. Since the free liquid surface is held stationary, or can be returned to its stationary state in a comparatively short time, the reflecting light or transmitting light is not disturbed. Thus, a stable measurement can be obtained, even when the outside temperature is suddenly changed.

The foregoing detailed description is of the best presently contemplated modes of carrying out the invention. This description is not to be taken in a limiting sense, but is made merely for the purpose of illustrating the general principles of the invention since the scope of the invention best is defined by the appended claims.

What is claimed is:

1. An inclination measuring apparatus comprising:
   a liquid for obtaining a free liquid surface perpendicular to the direction of gravity;
   a container having said liquid sealed therein and having a bottom surface portion comprising a prism; and
   a member provided under said free liquid surface, said member having better thermal conductivity than said liquid and having an opening therethrough for transmission of light from said bottom surface portion.

2. An inclination measuring apparatus according to claim 1 wherein said member has an irregular portion.

3. An inclination measuring apparatus according to claim 1 or claim 2 wherein said member includes a metal.

4. The apparatus of claim 3 wherein said metal is selected from the group consisting of copper and aluminum.

* * * * *